United States Patent
Nam

(10) Patent No.: US 10,538,163 B2
(45) Date of Patent: Jan. 21, 2020

(54) APPARATUS AND METHOD FOR FAILSAFE IN ELECTRIC CORNER MODULE SYSTEM

(71) Applicant: MANDO CORPORATION, Gyeonggi-do (KR)

(72) Inventor: Ik Hyeon Nam, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 166 days.

(21) Appl. No.: 15/693,429

(22) Filed: Aug. 31, 2017

(65) Prior Publication Data
US 2018/0065488 A1 Mar. 8, 2018

(30) Foreign Application Priority Data

Sep. 2, 2016 (KR) .................. 10-2016-0113214

(51) Int. Cl.
| | |
|---|---|
| B60L 3/00 | (2019.01) |
| B60L 7/00 | (2006.01) |
| B60L 15/20 | (2006.01) |
| B60T 8/172 | (2006.01) |
| B60T 8/88 | (2006.01) |
| B60T 7/04 | (2006.01) |
| B60T 13/74 | (2006.01) |

(52) U.S. Cl.
CPC ............. *B60L 3/0076* (2013.01); *B60L 7/006* (2013.01); *B60L 15/2009* (2013.01); *B60T 8/172* (2013.01); *B60L 2240/423* (2013.01); *B60L 2250/26* (2013.01); *B60T 7/042* (2013.01); *B60T 13/741* (2013.01); *B60T 2220/04* (2013.01); *B60T 2270/404* (2013.01)

(58) Field of Classification Search
CPC ...... B60L 3/0076; B60L 7/006; B60L 5/2009; B60T 8/172; B60T 8/885
USPC .......................................................... 701/70
See application file for complete search history.

(56) References Cited

U.S. PATENT DOCUMENTS

| | | | | |
|---|---|---|---|---|
| 2010/0062897 A1* | 3/2010 | Nishino | .................... | B60T 1/10 477/29 |
| 2011/0241417 A1* | 10/2011 | Miyazaki | ................ | B60T 7/042 303/2 |
| 2015/0217741 A1* | 8/2015 | Kikawa | .................... | B60L 7/18 701/71 |

FOREIGN PATENT DOCUMENTS

KR 10-2015-0061784 6/2015

* cited by examiner

*Primary Examiner* — Yazan A Soofi
(74) *Attorney, Agent, or Firm* — Ladas & Parry, LLP

(57) ABSTRACT

Provided are an apparatus and a method for failsafe of an electric corner module (ECM) system. The fail-safe apparatus of an ECM system includes a pressure sensor configured to sense a pressure of a brake booster of a vehicle, a pedal stroke sensor configured to sense an angle of a brake pedal of the vehicle, a motor configured to drive a wheel of the vehicle, a pedal displacement calculator configured to calculate a displacement of the brake pedal when the pressure of the brake booster sensed by the pressure sensor is less than a reference pressure, and a reverse torque calculator configured to calculate a reverse torque for driving the motor to provide a braking force to the wheel on the basis of the displacement of the brake pedal and a maximum torque according to a revolutions per minute (RPM) of the motor.

19 Claims, 7 Drawing Sheets

APPARATUS AND METHOD FOR FAILSAFE IN ELECTRIC CORNER MODULE SYSTEM

CROSS-REFERENCE TO RELATED APPLICATION

This application claims priority to and the benefit of Korean Patent Application No. 2016-0113214, filed on Sep. 2, 2016, the disclosure of which is incorporated herein by reference in its entirety.

BACKGROUND

1. Field of the Invention

The present invention relates to an electric corner module (ECM) system, and more particularly, to an apparatus and a method for failsafe in an ECM system, capable of preventing a failure in a braking function caused by a shortage of pressure of a brake booster.

2. Discussion of Related Art

Generally, in the case of an electric vehicle or a hybrid vehicle, unlike a vehicle including an internal-combustion engine, a motor is mounted in a wheel for power transmission and driving of the motor is used as a power source.

A power transmission system having such a structure includes an electric corner module (ECM) and an inwheel motor (IM). Here, a power transmission system of an ECM system structure has a structure in which a general brake such as a motor brake, a caliper, a drum brake and the like is installed in a wheel.

A fail-safe function capable of maintaining pressure by applying pressure to a brake booster by using a motor when pressure of the brake booster is lacking due to a failure of a pressure maintenance function of the brake booster is provided in such an ECM system.

However, in this case, since the fail-safe function operates only in the case in which the pressure maintenance function of the brake booster fails, when the pressure of the brake booster is less than a reference due to another cause and a brake function is not normally provided, it is impossible to provide the fail-safe function regardless of the abnormality of the brake booster.

PRIOR ART DOCUMENT

Patent Document (Patent document 1) KR2015-0061784 A

SUMMARY OF THE INVENTION

It is an aspect of the present invention to provide an apparatus and a method for failsafe in an electric corner module (ECM) system capable of responding to a failure of a pressure maintenance function of a brake booster as well as another failure with a fail-safe function.

According to an aspect of the present invention, there is provided a fail-safe apparatus of an ECM system, including a pressure sensor configured to sense a pressure of a brake booster of a vehicle, a pedal stroke sensor configured to sense an angle of a brake pedal of the vehicle, a motor configured to drive a wheel of the vehicle, a pedal displacement calculator configured to calculate a displacement of the brake pedal when the pressure of the brake booster sensed by the pressure sensor is less than a reference pressure, and a reverse torque calculator configured to calculate a reverse torque for driving the motor to provide a braking force to the wheel on the basis of the displacement of the brake pedal and a maximum torque according to a revolutions per minute (RPM) of the motor.

The pedal displacement calculator may include a maximum displacement calculator configured to calculate a maximum displacement of the brake pedal according to the sensed pressure of the brake booster and a current displacement calculator configured to calculate a current displacement of the brake pedal according to the angle sensed by the pedal stroke sensor.

The fail-safe apparatus may further include a comparator configured to compare the pressure of the brake booster sensed by the pressure sensor with the reference pressure.

Motors may be provided only at each of front wheels or rear wheels.

Motors may be provided at all front wheels or rear wheels.

The fail-safe apparatus may further include a distributor configured to distribute a driving force of the motor and transfer the driving force to each of both wheels of front wheels or rear wheels.

The fail-safe apparatus may further include an individual wheel reverse torque calculator configured to calculate an individual wheel reverse torque for independently driving each of a plurality of motors installed for each of the wheels on the basis of the reverse torque calculated by the reverse torque calculator when the plurality of motors are provided at the wheels.

The individual wheel reverse torque calculator may calculate the individual wheel reverse torque with a ratio according to a front wheel and rear wheel distribution logic.

The individual wheel reverse torque calculator may calculate the individual wheel reverse torque according to a running stability logic including electronic stability control (ESC).

The reverse torque calculator may calculate a reverse torque T according to a following equation, $T=B/A \times C$. Here, A may refer to a maximum displacement of the brake pedal according to the sensed pressure of the brake booster, B may refer to a sensed current displacement of the brake pedal, and C may refer to the maximum torque according to the RPM of the motor.

According to another aspect of the present invention, there is provided a fail-safe method of an ECM system, including comparing a pressure of a brake booster sensed by a pressure sensor with a reference pressure, calculating a displacement of a brake pedal when the sensed pressure of the brake pedal is less than the reference pressure, calculating reverse torque for driving a motor configured to drive a wheel of a vehicle on the basis of the displacement of the brake pedal and a maximum torque of the motor, and driving the motor according to the calculated reverse torque to provide a braking force to the wheel.

The calculating of the displacement may include calculating a maximum displacement of the brake pedal of the vehicle according to the pressure of the brake pedal and calculating a current displacement of the brake pedal according to an angle sensed by a pedal stroke sensor.

The driving may include driving motors provided only at each of front wheels or rear wheels.

The driving may include driving motors provided at all front wheels or rear wheels.

The driving may include distributing a driving force of the motor and transferring the driving force to each of both wheels of front wheels or rear wheels.

The driving may include driving calculating an individual wheel reverse torque for independently driving each of a plurality of motors installed for each of the wheels on the basis of the reverse torque calculated in the calculating of reverse torque when the plurality of motors are provided at the wheels.

The calculating of the individual wheel reverse torque may include calculating the individual wheel reverse torque with a ratio according to a front wheel and rear wheel distribution logic.

The calculating of the individual wheel reverse torque may include calculating the individual wheel reverse torque according to a running stability logic including ESC.

The calculating of the reverse torque may include calculating a reverse torque T according to a following equation, $T=B/A \times C$. Here, A may refer to a maximum displacement of the brake pedal according to the sensed pressure of the brake booster, B may refer to a sensed current displacement of the brake pedal, and C may refer to the maximum torque according to the RPM of the motor.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
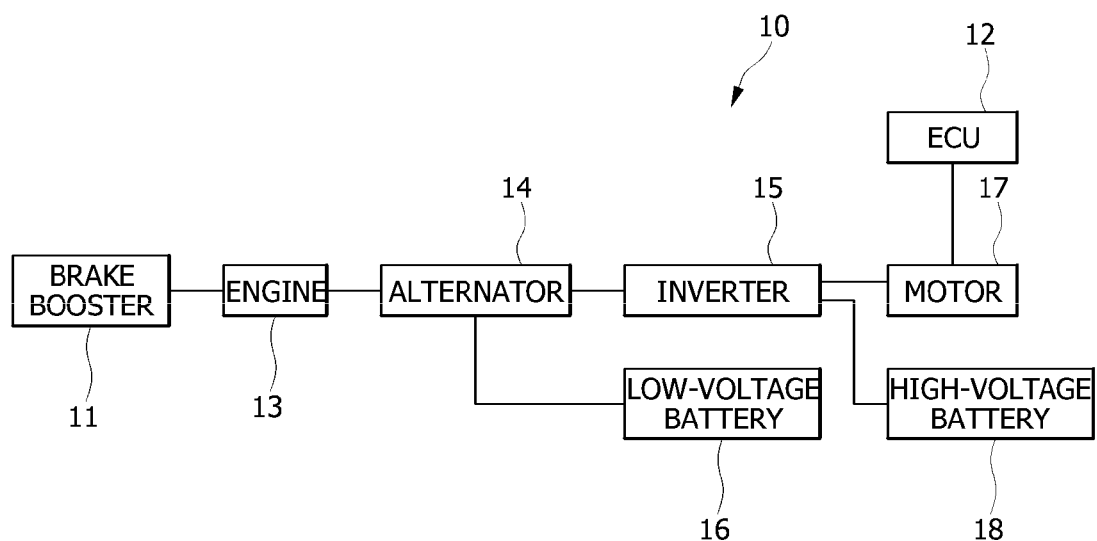
FIG. 1 is a schematic configuration diagram of a vehicle including an electric corner module (ECM) according to one embodiment of the present invention.

Hereinafter, one embodiment of the present invention will be described in detail with reference to the attached drawings to allow one of ordinary skill in the art to easily implement the present invention. The present invention may be embodied in several various forms and is not limited to the embodiment described herein. In the drawings, parts irrelevant to the description are omitted to clearly describe the present invention. Throughout the specification, like reference numerals refer to like elements.

Hereafter, a fail-safe apparatus of an electric corner module (ECM) system according to one embodiment of the present invention will be described in detail with reference to the drawings.

FIG. 1 is a schematic configuration diagram of a vehicle including an ECM according to one embodiment of the present invention.

Referring to FIG. 1, the vehicle including the ECM according to one embodiment of the present invention includes a brake booster 11, an electronic control unit (ECU) 12, an engine 13, an alternator 14, an inverter 15, a low-voltage battery 16, a motor 17, and a high-voltage battery 18.

The brake booster 11 may redouble an operating force of a brake pedal by using a negative pressure provided by a suction system of the engine 13.

The ECU 12 may control a fail-safe function when a pressure of the brake booster 11 is less than a reference pressure. The ECU 12 may include a controller 130 of a fail-safe apparatus 100, which will be described below.

The engine 13 may be connected to the alternator 14 and the brake booster 11 and provide power thereto.

The alternator 14 may generate electrical energy by using power supplied from the engine 13 and may charge the low-voltage battery 16 or provide the inverter 15 with the electrical energy.

The inverter 15 is a bidirectional converter configured to convert an alternating current (AC) into a direct current (DC) or convert a DC into an AC, and may convert the electrical energy supplied from the alternator 14 and charge the high-voltage battery 18 therewith or may convert electrical energy supplied from the high-voltage battery 18 and supply the converted energy to the alternator 14.

The low-voltage battery 16 may be charged with the converted electrical energy supplied by the alternator 14 and may supply charged power to a vehicle electronics load. For example, the low-voltage battery 16 may be a 12V battery.

The motor 17 may receive power supplied from the inverter 15 and may be driven by the ECU 12. Such a motor 17 is a component of the ECM system while coasting and may be a motor provided at a wheel.

The high-voltage battery 18 includes a plurality of super capacitors and may be, for example, a 330V battery. Such a high-voltage battery 18 may be charged with the electrical energy converted by the inverter 15.

Figure 2:
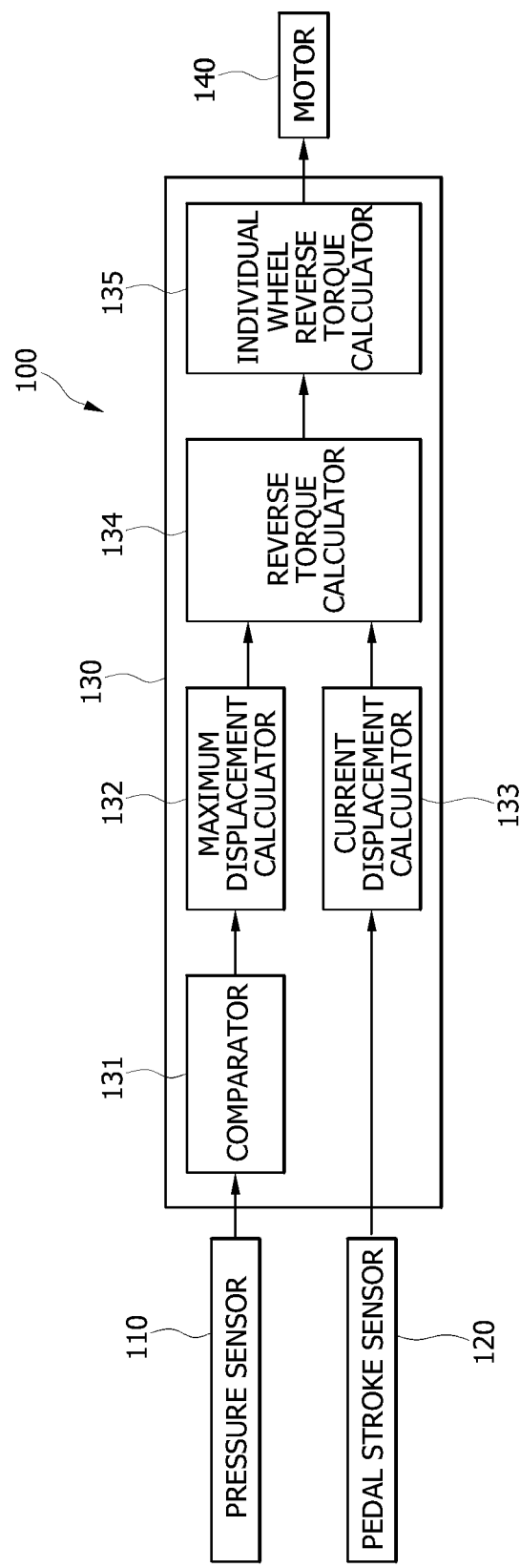
FIG. 2 is a block diagram of a fail-safe apparatus according to one embodiment of the present invention.

FIG. 2 is a block diagram of the fail-safe apparatus 100 according to one embodiment of the present invention.

The fail-safe apparatus 100 includes a pressure sensor 110, a pedal stroke sensor 120, a controller 130, and a motor 140.

The pressure sensor 110 may be installed in the brake booster 11 of the vehicle and may sense a pressure of the brake booster 11.

The pedal stroke sensor 120 may be installed at a brake pedal operated by a driver and may sense an angle of the brake pedal.

The controller 130 may compare the pressure of the brake booster 11 sensed by the pressure sensor 110 with the reference pressure. Also, when the pressure of the brake booster 11 is determined to be insufficient, the controller 130 may calculate a displacement of the brake pedal and a reverse torque according to the maximum torque of the motor 140 and may control the motor 140 to drive corresponding to the lack of pressure of the brake booster 11. Here, the reverse torque means torque in a direction opposite to a forward direction of the motor 140.

The above-described controller 130 may control the fail-safe function of the ECM system and may be embodied by the ECU 12 of FIG. 1. The controller 130 includes a comparator 131, a maximum displacement calculator 132, a current displacement calculator 133, and a reverse torque calculator 134.

The comparator 131 may compare the pressure of the brake booster 11 sensed by the pressure sensor 110 with the reference pressure. That is, the comparator 131 may determine whether the sensed pressure of the brake booster 11 is less than the reference pressure and may determine an insufficient pressure state of the brake booster 11 when the pressure is less than the reference pressure. Here, since the pressure of the brake booster 11 is a negative pressure, the reference pressure may be an absolute value of the pressure. That is, the comparator 131 may compare an absolute value of a currently sensed pressure of the brake booster 11 with the reference pressure.

Here, a cause of the lack of pressure of the brake booster 11 may include a failure of a pressure maintenance function of the brake booster 11, a stall of the engine 13 caused by a lack of fuel, a shortfall of charging voltage of the low-voltage battery 16, a failure of a master brake cylinder, a failure of a vacuum chamber of the brake booster 11, and the like.

When the comparator determines that the pressure is lacking, the maximum displacement calculator 132 may calculate a maximum displacement of the brake pedal according to the sensed pressure of the brake booster 11. Here, a maximum displacement calculation may be performed using a maximum displacement table preset according to a level of pressure of the brake booster 11.

The current displacement calculator 133 may calculate a current displacement of the brake pedal according to an angle sensed by the pedal stroke sensor 120. That is, the current displacement calculator 133 may calculate a displacement according to a current angle of the brake pedal in the insufficient pressure state of the brake booster 11.

Here, since displacement of the brake pedal is reduced when the pressure of the brake booster 11 drops, it is impossible to apply a displacement of the brake pedal applied to a normal regenerative brake. Accordingly, the maximum displacement and the current displacement of the brake pedal according to the sensed pressure of the brake booster 11 are calculated.

The reverse torque calculator 134 may calculate a reverse torque for a brake based on the maximum displacement of the brake pedal calculated by the maximum displacement calculator 132, the current displacement of the brake pedal calculated by the current displacement calculator 133, and a maximum torque according to a revolutions per minute (RPM) of the motor 140.

Here, the reverse torque calculator 134 may calculate a reverse torque T according to the following Equation.

$$T = B/A \times C$$

Here, A refers to a maximum displacement of a brake pedal according to a sensed pressure of a brake booster, B refers to a sensed current displacement of the brake pedal, and C refers to a maximum torque according to an RPM of a motor.

As described above, since a reverse torque of the motor 140 has the same level as a brake torque corresponding to a current displacement of the brake pedal when the pressure of the brake booster 11 is less than the reference pressure, it is possible to calculate a reverse torque corresponding to the brake torque according to the displacement of the brake pedal.

That is, the reverse torque calculator 134 may calculate the reverse torque by applying an amount of torque of the motor 140 to the brake torque according to a ratio of the current displacement of the brake pedal to the current maximum displacement of the brake pedal sensed by the pedal stroke sensor 120.

The motor 140 drives a wheel of the vehicle and may be the motor 17 of FIG. 1. Such a motor 140 may be driven according to the reverse torque calculated by the reverse torque calculator 134 and provide a braking force to the wheel.

Here, as is described above, as shown in FIGS. 3 to 6, at least one motor 140 may be provided or the motor 140 may be provided for each of the wheels depending on a type of vehicle.

Figure 3:
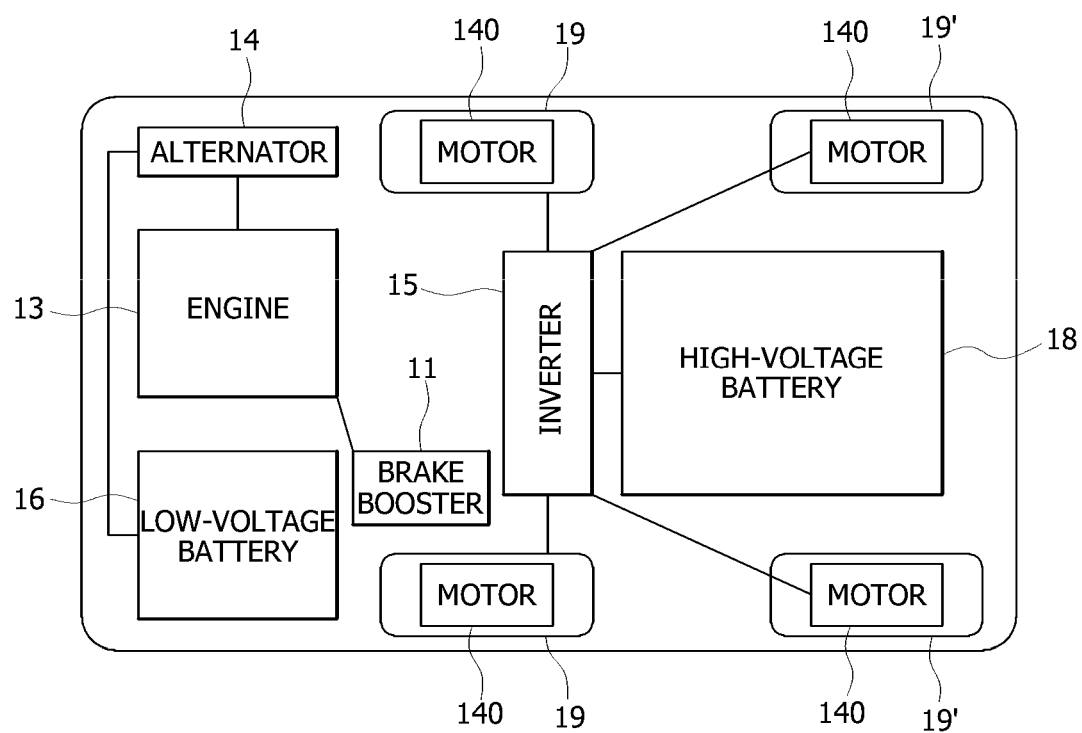
FIG. 3 is a configuration diagram illustrating a state in which motors are included in all four wheels of a vehicle to which the fail-safe apparatus according to one embodiment is applied.
Figure 4:
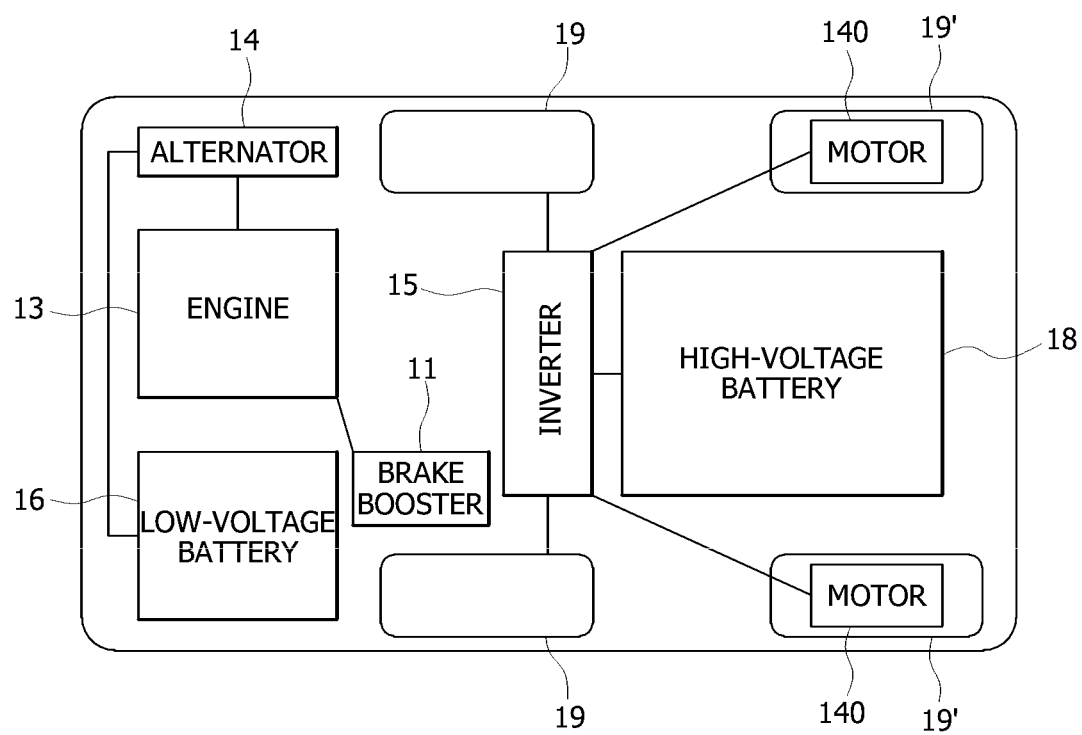
FIG. 4 is a configuration diagram illustrating a state in which motors are included only in rear wheels of a vehicle to which the fail-safe apparatus according to one embodiment is applied.
Figure 5:
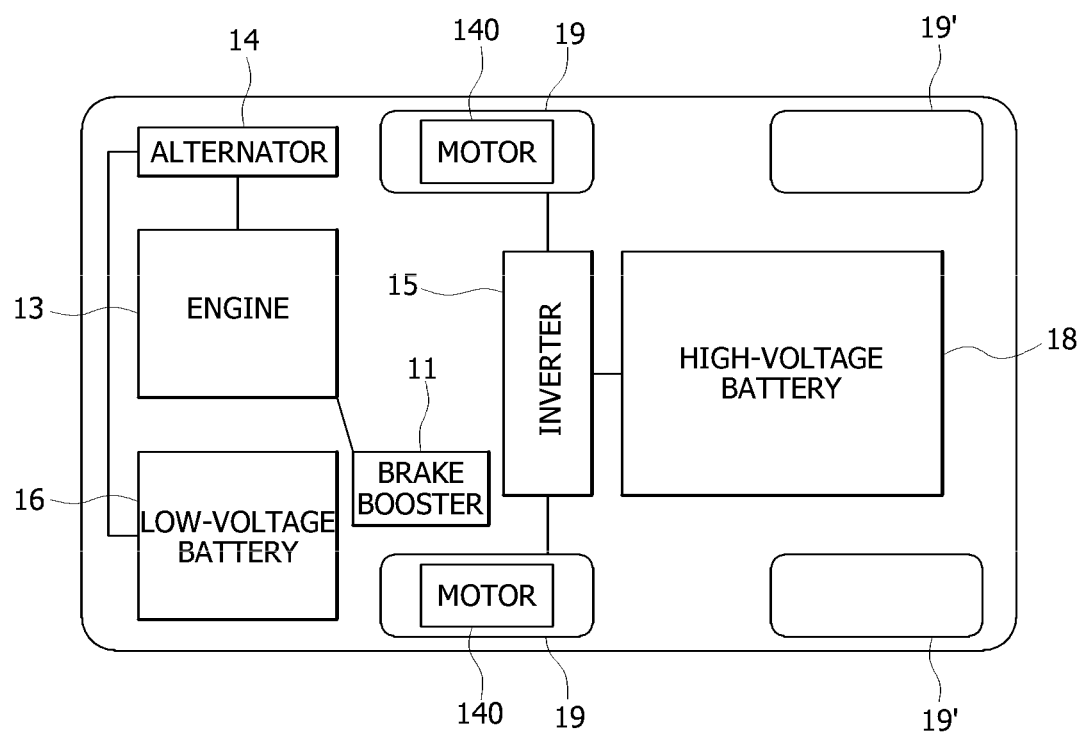
FIG. 5 is a configuration diagram illustrating a state in which motors are included only in front wheels of a vehicle to which the fail-safe apparatus according to one embodiment is applied.
Figure 6:
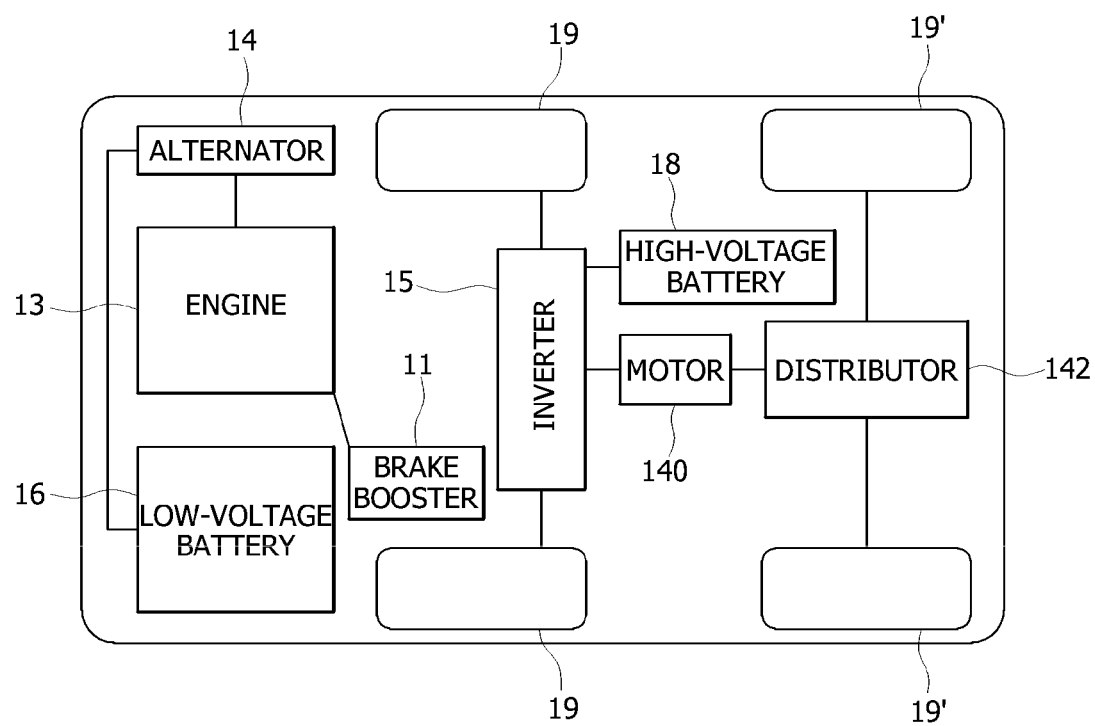
FIG. 6 is a configuration diagram illustrating a state in which a shaft-drive motor is included in a vehicle to which the fail-safe apparatus according to one embodiment is applied.

FIG. 3 is a configuration diagram illustrating a state in which motors are included in all four wheels of a vehicle to which the fail-safe apparatus according to one embodiment is applied, FIG. 4 is a configuration diagram illustrating a state in which motors are included in rear wheels 19' of a vehicle to which the fail-safe apparatus according to one embodiment is applied, FIG. 5 is a configuration diagram illustrating a state in which motors are included only in front wheels of a vehicle to which the fail-safe apparatus according to one embodiment is applied, and FIG. 6 is a configuration diagram illustrating a state in which a shaft-drive motor is included in a vehicle to which the fail-safe apparatus according to one embodiment is applied.

Referring to FIG. 3, the motor 140 may be provided at all of the front wheels 19 and rear wheels 19'. That is, four motors 140 may be provided at all of the wheels 19 and 19'. Here, since a plurality of such motors 140 provided at all of the front wheels 19 and the rear wheels 19' are uniformly driven according to a reverse torque calculated by the reverse torque calculator 134, it is possible to stably brake the vehicle when the pressure of the brake booster 11 is insufficient.

Referring to FIG. 4, the motor 140 may be provided only at each of the rear wheels 19'. That is, two motors 140 may be provided at both of the rear wheels 19'. Here, since a plurality of such motors 140 provided at both of the rear wheels 19' are uniformly driven according to the reverse torque calculated by the reverse torque calculator 134, it is possible to stably brake the vehicle when the pressure of the brake booster 11 is insufficient.

Referring to FIG. 5, the motor 140 may be provided only at each of the front wheels 19. That is, two motors 140 may be provided at both of the front wheels 19. Here, since a plurality of such motors 140 provided at both of the front wheels 19 are uniformly driven according to the reverse torque calculated by the reverse torque calculator 134, it is possible to stably brake the vehicle when the pressure of the brake booster 11 is insufficient.

Referring to FIG. 6, only one motor 140 may be provided for the rear wheels 19'. Here, the motor 140 may be a shaft-drive motor. Here, a distributor 142 configured to distribute a driving force of the motor 140 may be further provided at one side of the motor 140. The distributor 142 may transfer the driving force of the motor 140 to both of the rear wheels 19'.

Here, although only one motor 140 is shown and described as being provided for the rear wheels 19', the only one motor 140 may be provided for the front wheels 19 or may be provided for each of the front wheels 19 and the rear wheels 19'.

Here, since the only one motor 140 provided for the rear wheels 19' is driven according to the reverse torque calculated by the reverse torque calculator 134 and the driving force thereof is distributed by the distributor 142 to both of the rear wheels 19', it is possible to stably brake the vehicle when the pressure of the brake booster 11 is insufficient.

Meanwhile, when a plurality of such motors 140 are provide for each of the wheels 19 and 19', the controller 130 may further include an individual wheel reverse torque calculator 135.

The individual wheel reverse torque calculator 135 may calculate an individual wheel reverse torque to independently drive the plurality of motors 140 respectively installed at the wheels 19 and 19' on the basis of on the reverse torque calculated by the reverse torque calculator 134. Here, the individual wheel reverse torque may be calculated to provide a different braking force for each of the wheels 19 and 19' to stably brake the vehicle.

For example, the individual wheel reverse torque calculator 135 may calculate an individual wheel reverse torque with a ratio according to a front wheel and rear wheel distribution logic. Here, the front wheel and rear wheel distribution logic is an electronic brake force distribution (EBD) for distributing different braking forces to the front wheels 19 and the rear wheels 19' depending on the number of passengers or a live load. Here, a distribution ratio between the front wheels and rear wheels may be 6:4 to 7:3. That is, when the distribution ratio between the front wheels and rear wheels is determined by sensing a speed of the vehicle and weights of the front wheels 19 and the rear wheels 19', the individual wheel reverse torque calculator 135 may calculate an individual wheel reverse torque according to the distribution ratio between the front wheels and rear wheels on the basis of the reverse torque calculated by the reverse torque calculator 134.

Also, the individual wheel reverse torque calculator 135 may calculate the individual wheel reverse torque according to a running stability logic such as electronic stability control (ESC) and the like. That is, the individual wheel reverse torque calculator 135 may calculate the individual wheel reverse torque by reflecting a torque difference between left/right wheels calculated in real time with the running stability logic calculated for stable running on the reverse torque calculated by the reverse torque calculator 134.

Here, only one or both of the front wheel and rear wheel distribution logic and the running stability logic may be selectively used depending on a position of a wheel at which the motor 140 is provided.

Here, since the motor 140 is driven according to the individual wheel reverse torque calculated by the individual wheel reverse torque calculator 135 and provides a different braking force for each of the wheels 19 and 19' of the vehicle, braking of the vehicle caused by a lack of pressure of the brake booster 11 may be stably performed.

Since the fail-safe apparatus 100 may respond not only to a simple failure of the pressure maintenance function of the brake booster 11 but also various failures related to the brake booster 11 as described above due to the above-described configuration, a failsafe application range may be extended and user convenience may be increased.

Figure 7:
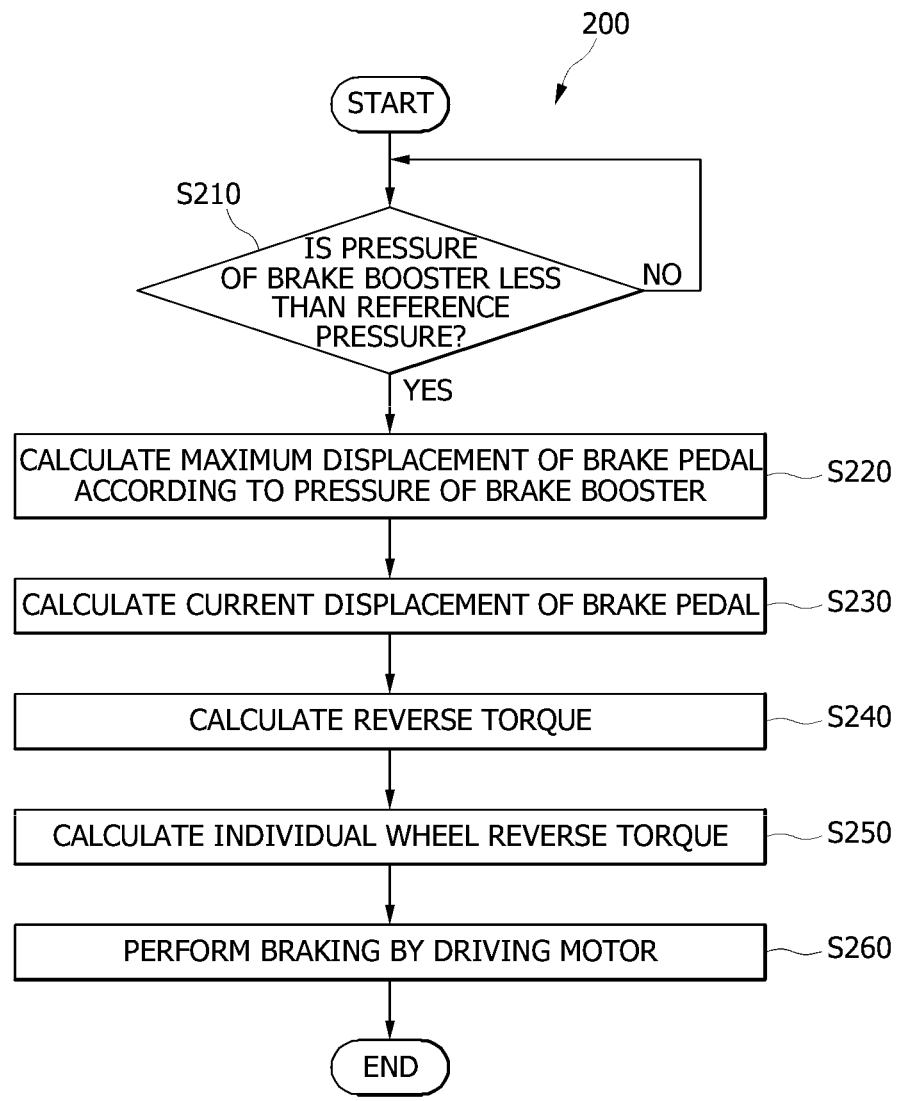
FIG. 7 is a flowchart illustrating a fail-safe method according to one embodiment of the present invention.

Hereafter, a fail-safe method according to one embodiment of the present invention will be described with reference to FIG. 7. FIG. 7 is a flowchart illustrating a fail-safe method according to one embodiment of the present invention.

A fail-safe method 200 includes determining whether a pressure of the brake booster 11 is insufficient (S210), calculating a maximum displacement of the brake pedal (S220), calculating a current displacement of the brake pedal (S230), calculating a reverse torque (S240), calculating an individual wheel reverse torque (S250), and driving a motor (S260).

In more detail, as shown in FIG. 7, first, the pressure of the brake booster 11 may be compared with a reference pressure to determine whether the pressure is less than the reference pressure (S210) and the pressure of the brake booster 11 may be continuously sensed. Here, since the pressure of the brake booster 11 is a negative pressure, the reference pressure may be an absolute value of the pressure. That is, an absolute value of the currently sensed pressure in 210 may be compared with the reference pressure.

As a result of the comparison in S210, when the pressure of the brake booster 11 is less than the reference pressure, a fail-safe function of the brake booster 11 may be initiated. As described above, an insufficient pressure state of the brake booster 11 sensed by the pressure sensor 110 may be determined. Here, since displacement of the brake pedal is reduced when the pressure of the brake booster 11 drops, it is impossible to apply a displacement of the brake pedal applied to a normal regenerative brake. Accordingly, the maximum displacement and the current displacement of the brake pedal according to the sensed pressure of the brake booster 11 are calculated.

That is, when the pressure of the brake booster 11 is less than the reference pressure, the maximum displacement of the brake pedal may be calculated according to the sensed pressure of the brake booster 11 (S220). Here, the maximum displacement of the brake pedal may be calculated using a preset maximum displacement table according to a level of pressure of the brake booster 11.

Next, the current displacement of the brake pedal may be calculated according to an angle sensed by the pedal stroke sensor 120 (S230). Here, a displacement according to a current angle of the brake pedal in the insufficient pressure state of the brake booster 11 may be calculated.

Next, a reverse torque may be calculated on the basis of the calculated maximum displacement and current displacement of the brake pedal and the maximum torque of the motor 140 provide for each of the wheels 19 and 19'.

Here, the reverse torque T may be calculated by using the following equation.

$$T = B/A \times C$$

Here, A refers to a maximum displacement of a brake pedal according to a sensed pressure of a brake booster, B refers to a sensed current displacement of the brake pedal, and C refers to a maximum torque according to an RPM of a motor.

As is described above, to calculate a reverse torque having the same level as a brake torque corresponding to the current displacement of the brake pedal when the pressure of the brake booster 11 is less than the reference pressure, the reverse torque may be calculated by applying a torque amount of the motor 140 of the brake torque according to a ratio of the current displacement to a current maximum displacement of the brake pedal sensed by the pedal stroke sensor 120.

Next, the individual wheel reverse torque may be calculate to independently drive the motor 140 installed for each of the wheels 19 and 19' on the basis of the reverse torque calculated in S240 (S250). That is, the individual wheel reverse torque may be calculated to provide a different braking force for each of the wheels 19 and 19' to stably brake the vehicle. Here, S250 may be performed only when the plurality of motors 140 are provided at the wheels 19 and 19'. That is, when only one motor 140, which is a shaft-drive motor, is provided, S250 may be omitted.

For example, the individual wheel reverse torque may be calculated according to a ratio according to a front wheel and rear wheel distribution logic. That is, to provide a different braking force for each of the front wheels 19 and rear wheels 19' according to the number of passengers or a live load, the individual wheel reverse torque may be calculated by applying the front wheel and rear wheel distribution logic. Here, a distribution ratio between front wheels and rear wheels may be 6:4 to 7:3. That is, when the distribution ratio between the front wheels and the rear wheels is determined by sensing a speed of the vehicle and weights of the front wheels 19 and the rear wheels 19', the individual wheel reverse torque according to the distribution ratio between the front wheels and rear wheels may be calculated on the basis of the reverse torque calculated in S240.

Also, the individual wheel reverse torque may be calculated according to a running stability logic such as ESC. That is, the individual wheel reverse torque may be calculated by reflecting a torque difference between left/right wheels calculated in real time with the running stability logic calculated for stable running on the reverse torque calculated in S240.

Here, only one or both of the front wheel and rear wheel distribution logic and the running stability logic may be selectively used depending on a position of a wheel at which the motor 140 is provided.

Next, the motor 140 may be driven according to the reverse torque calculated to provide braking forces to the wheels 19 and 19' (S260). That is, since the motor 140 is driven according to a uniform reverse torque or the individual wheel reverse torque, braking of the vehicle caused by the lack of pressure of the brake booster 11 may be stably performed.

Since the above-described method may respond not only to a simple failure of the pressure maintenance function of the brake booster 11 but also various failures related to the brake booster 11 as described above due to the above-described configuration, a failsafe application range may be extended and user convenience may be increased.

The above-described operations may be performed by the fail-safe apparatus 100 shown in FIG. 2, and particularly may be embodied as software programs configured to perform the above operations. In this case, these programs may be stored in a computer-readable recording medium or may be transmitted by a computer data signal coupled with a carrier wave through a transmission medium or a communication network.

Here, the computer-readable recording medium may include all types of recording media in which computer-readable data are stored, for example, a read-only memory (ROM), a random-access memory (RAM), a compact disc (CD)-ROM, a digital versatile disc (DVD)-ROM, a DVD-RAM, a magnetic tape, a floppy disk, a hard disk, an optical data storage device, and the like.

According to one embodiment of the present invention, since an apparatus and a method for failsafe of an ECM system may respond to various failure-causes in addition to a failure of a pressure maintenance function of a brake booster by implementing a fail-safe function of the brake booster by using a motor installed for each wheel, an application range of the failsafe may be extended and user convenience may be increased.

Although one embodiment of the present invention has been described above, the concept of the present invention is not limited to the embodiment disclosed in the specification, other embodiments may be easily provided by one of ordinary skill in the art through addition, modification, deletion, supplementation, and the like, but such embodiments are included within the conceptual scope of the present invention.

What is claimed is:

1. A fail-safe apparatus of an electric corner module (ECM) system, comprising:
    a pressure sensor configured to sense a pressure of a brake booster of a vehicle;
    a pedal stroke sensor configured to sense an angle of a brake pedal of the vehicle;
    a motor configured to drive a wheel of the vehicle;
    a pedal displacement calculator configured to calculate a displacement of the brake pedal when the pressure of the brake booster sensed by the pressure sensor is less than a reference pressure; and
    a reverse torque calculator configured to calculate a reverse torque for driving the motor to provide a braking force to the wheel on the basis of the displacement of the brake pedal and a maximum torque according to a revolutions per minute (RPM) of the motor.

2. The fail-safe apparatus of claim 1, wherein the pedal displacement calculator comprises:
    a maximum displacement calculator configured to calculate a maximum displacement of the brake pedal according to the sensed pressure of the brake booster; and
    a current displacement calculator configured to calculate a current displacement of the brake pedal according to the angle sensed by the pedal stroke sensor.

3. The fail-safe apparatus of claim 1, further comprising a comparator configured to compare the pressure of the brake booster sensed by the pressure sensor with the reference pressure.

4. The fail-safe apparatus of claim 1, wherein motors are provided only at each of front wheels or rear wheels.

5. The fail-safe apparatus of claim 1, wherein motors are provided at all of front wheels or rear wheels.

6. The fail-safe apparatus of claim 1, further comprising a distributor configured to distribute a driving force of the motor and transfer the driving force to each of both wheels of front wheels and rear wheels.

7. The fail-safe apparatus of claim 1, further comprising an individual wheel reverse torque calculator configured to calculate an individual wheel reverse torque for independently driving each of a plurality of motors installed for each of the wheels on the basis of the reverse torque calculated by the reverse torque calculator when the plurality of motors are provided at the wheels.

8. The fail-safe apparatus of claim 7, wherein the individual wheel reverse torque calculator calculates the individual wheel reverse torque with a ratio according to a front wheel and rear wheel distribution logic.

9. The fail-safe apparatus of claim 7, wherein the individual wheel reverse torque calculator calculates the individual wheel reverse torque according to a running stability logic including electronic stability control (ESC).

10. The fail-safe apparatus of claim 1, wherein the reverse torque calculator calculates a reverse torque T according to a following equation, $$T = B/A \times C,$$

wherein A refers to a maximum displacement of the brake pedal according to the sensed pressure of the brake booster, B refers to a sensed current displacement of the brake pedal, and C refers to the maximum torque according to the RPM of the motor.

11. A fail-safe method of an ECM system, comprising:
comparing a pressure of a brake booster sensed by a pressure sensor with a reference pressure;
calculating a displacement of a brake pedal when the sensed pressure of the brake pedal is less than the reference pressure;
calculating a reverse torque for driving a motor configured to drive a wheel of a vehicle on the basis of the displacement of the brake pedal and a maximum torque of the motor; and
driving the motor according to the calculated reverse torque to provide a braking force to the wheel.

12. The fail-safe method of claim 11, wherein the calculating of the displacement comprises:
calculating a maximum displacement of the brake pedal of the vehicle according to the pressure of the brake pedal; and
calculating a current displacement of the brake pedal according to an angle sensed by a pedal stroke sensor.

13. The fail-safe method of claim 11, wherein the driving comprises driving motors provided only at each of front wheels or rear wheels.

14. The fail-safe method of claim 11, wherein the driving comprises driving motors provided at all front wheels or rear wheels.

15. The fail-safe method of claim 11, wherein the driving comprises distributing a driving force of the motor and transferring the driving force to each of both wheels of front wheels or rear wheels.

16. The fail-safe method of claim 11, wherein the driving comprises calculating an individual wheel reverse torque for independently driving each of a plurality of motors installed for each of the wheels on the basis of the reverse torque calculated in the calculating of reverse torque when the plurality of motors are provided at the wheels.

17. The fail-safe method of claim 16, wherein the calculating of the individual wheel reverse torque comprises calculating the individual wheel reverse torque with a ratio according to a front wheel and rear wheel distribution logic.

18. The fail-safe method of claim 16, wherein the calculating of the individual wheel reverse torque comprises calculating the individual wheel reverse torque according to a running stability logic including ESC.

19. The fail-safe method of claim 11, wherein the calculating of the reverse torque comprises calculating a reverse torque T according to a following equation, $$T=B/A \times C,$$

wherein A refers to a maximum displacement of the brake pedal according to the sensed pressure of the brake booster, B refers to a sensed current displacement of the brake pedal, and C refers to the maximum torque according to the RPM of the motor.

* * * * *